US009506751B2

(12) United States Patent
Zhao

(10) Patent No.: US 9,506,751 B2
(45) Date of Patent: Nov. 29, 2016

(54) SOLAR BATTERY WIRELESS INCLINOMETER

(71) Applicant: BODE ENERGY EQUIPMENT CO., LTD., Xi'an (CN)

(72) Inventor: Min Zhao, Xi'an (CN)

(73) Assignee: BODE ENERGY EQUIPMENT CO., LTD., Xi'an (CN)

( * ) Notice: Subject to any disclaimer, the term of this patent is extended or adjusted under 35 U.S.C. 154(b) by 168 days.

(21) Appl. No.: 14/467,574

(22) Filed: Aug. 25, 2014

(65) Prior Publication Data

US 2016/0054123 A1 Feb. 25, 2016

(51) Int. Cl.
*G01C 9/06* (2006.01)
*G01C 25/00* (2006.01)
*E21B 43/12* (2006.01)

(52) U.S. Cl.
CPC .............. *G01C 9/06* (2013.01); *E21B 43/127* (2013.01); *G01C 25/00* (2013.01)

(58) Field of Classification Search
CPC .... E21B 43/127; E21B 44/00; E21B 44/005; E21B 47/00; E21B 47/0007; E21B 47/0008; G01C 9/06; G01C 25/00
USPC .......................................... 33/366.11, 366.13
See application file for complete search history.

(56) References Cited

U.S. PATENT DOCUMENTS

| 4,143,546 A | 3/1979 | Wiener |
| 4,363,605 A | 12/1982 | Mills |
| 4,490,816 A * | 12/1984 | Kehl ................. G11B 3/06 33/645 |
| 4,561,299 A | 12/1985 | Orlando et al. |
| 5,064,349 A | 11/1991 | Turner et al. |
| 5,182,946 A | 2/1993 | Boughner et al. |
| 5,291,777 A | 3/1994 | Chang et al. |
| 6,576,849 B2 | 6/2003 | Bliss et al. |

(Continued)

FOREIGN PATENT DOCUMENTS

| CN | 2714804 Y | 8/2005 | |
| CN | 2937474 Y * | 8/2007 | ............. E21B 47/00 |

(Continued)

OTHER PUBLICATIONS

PCT Notification of Transmittal of the International Search Report and the Written Opinion of the International Searching Authority dated Oct. 12, 2015 in PCT/IB2015/053311.

(Continued)

*Primary Examiner* — R. A. Smith
(74) *Attorney, Agent, or Firm* — Morgan, Lewis & Bockius LLP; Adam D. Brooke; John D. Zele

(57) ABSTRACT

An inclinometer that provides inclination data of a walking beam in a rod pumping system includes a cover including an indented portion external to the inclinometer. The cover is attached to a chassis which together provide an internal area. Magnets are attached to a bottom of the chassis to magnetically attach the inclinometer to the walking beam. A power supply within the internal area includes a power storage and a charger. A solar panel is disposed in the indented portion of the cover and electrically connects to the power supply through a hole in the cover. Beam angle sensor circuitry measures an inclination of the walking beam and transmits corresponding inclination measurement data via an antenna in the internal area. The power supply is configured to supply power to this beam angle sensor circuitry.

7 Claims, 7 Drawing Sheets

(56) References Cited

U.S. PATENT DOCUMENTS

| | | | |
|---|---|---|---|
| 7,219,723 B2 | 5/2007 | Barnes et al. | |
| 7,513,752 B2 | 4/2009 | Boone et al. | |
| 7,614,357 B2 * | 11/2009 | Hernandez | H01H 9/0033 116/289 |
| 7,856,727 B2 * | 12/2010 | Chiorean | E02F 9/265 33/1 N |
| 7,944,369 B2 * | 5/2011 | Appleyard | G08B 13/1436 340/689 |
| 8,157,537 B2 | 4/2012 | Chavez Zapata | |
| 8,769,839 B1 * | 7/2014 | Paesano | B64C 27/008 33/301 |
| 8,866,470 B2 * | 10/2014 | Taylor | G01C 9/06 324/207.25 |
| 9,255,506 B2 | 2/2016 | Cook | |
| 2006/0238336 A1 | 10/2006 | Zajac et al. | |
| 2009/0071645 A1 | 3/2009 | Kenison et al. | |
| 2011/0074334 A1 | 3/2011 | Wang et al. | |
| 2012/0020808 A1 | 1/2012 | Lawson et al. | |
| 2013/0127390 A1 | 5/2013 | DaCunha et al. | |
| 2013/0333880 A1 | 12/2013 | Raglin et al. | |
| 2015/0345280 A1 | 12/2015 | Krauss | |

FOREIGN PATENT DOCUMENTS

| | | |
|---|---|---|
| CN | 201159059 Y | 12/2008 |
| CN | 102434147 A | 5/2012 |
| CN | 202417478 U | 9/2012 |
| CN | 202707004 U | 1/2013 |
| GB | 2475074 A | 5/2011 |
| WO | 2010/114916 A1 | 10/2010 |
| WO | 2014098873 A1 | 6/2014 |

OTHER PUBLICATIONS

PCT Notification of Transmittal of the International Search Report and the Written Opinion of the International Searching Authority dated Feb. 16, 2016 in PCT/CN2015/094959.

Klimitchek, Randal, et al. "Integrated rod-pump controller cuts operating costs," Petroleum Technology Digest, reprinted from World Oil, Oct. 2003 Issue, pp. 1-2.

Tuominen, Juha "Hydraulic Boom Monitoring with IEEE 802.11 Based Wire Sensor Network," Master of Science Thesis, Tampere University of Technology, Apr. 2010, pp. 1-79.

USPTO Office Action dated Oct. 4, 2016 in related technology U.S. Appl. No. 14/272,105.

USPTO Office Action dated Oct. 17, 2016 in related technology U.S Appl. No. 14/547,345.

* cited by examiner

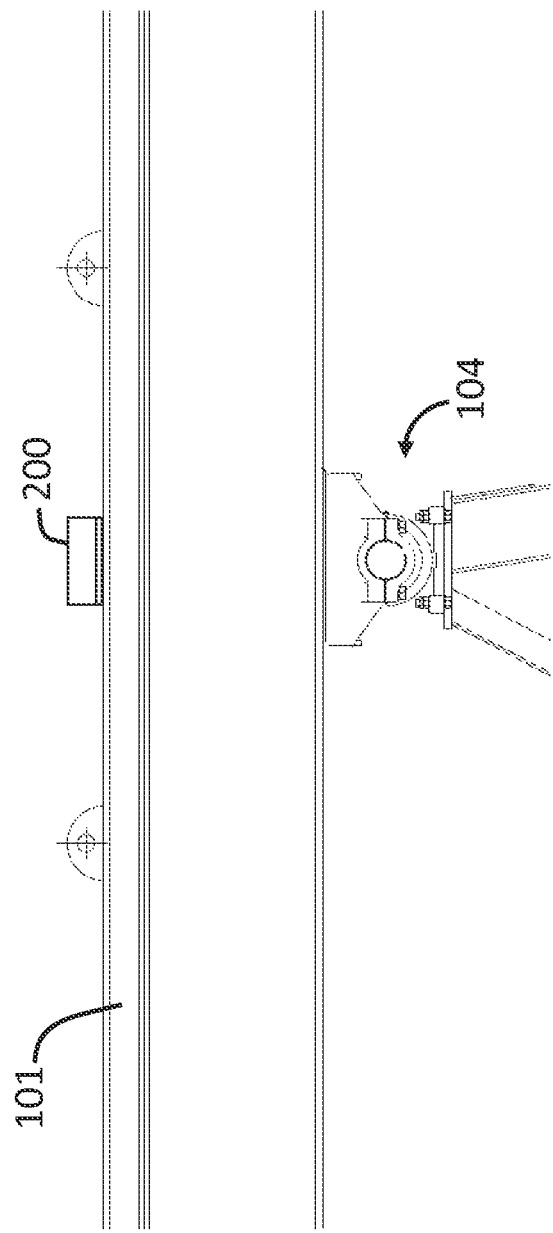

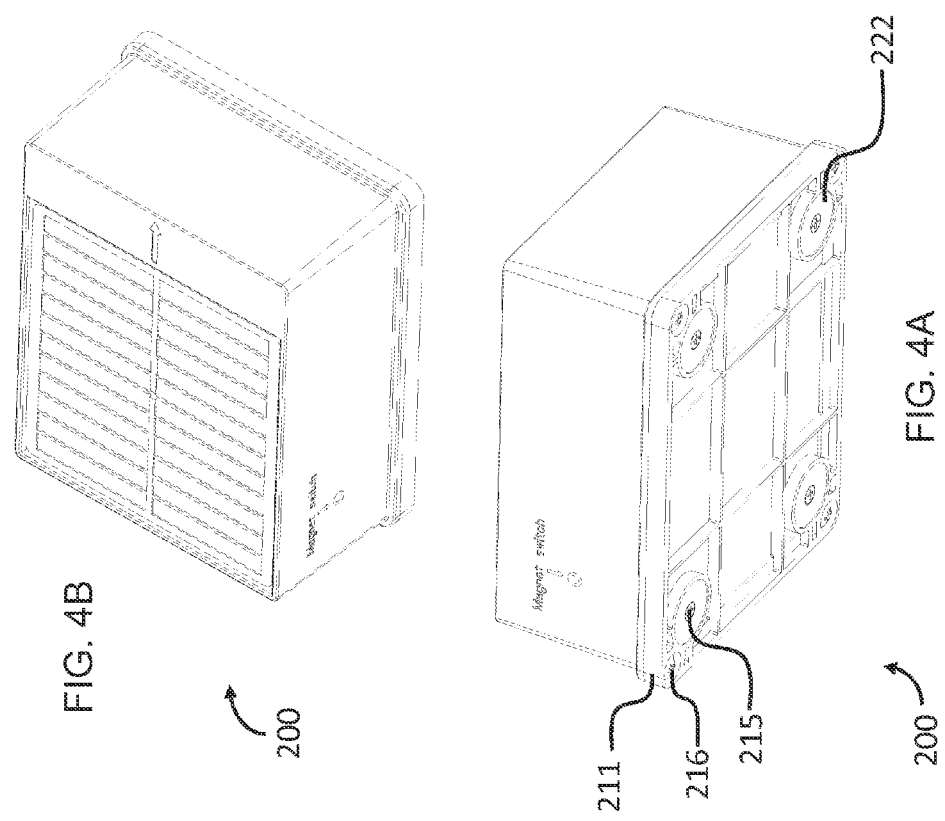

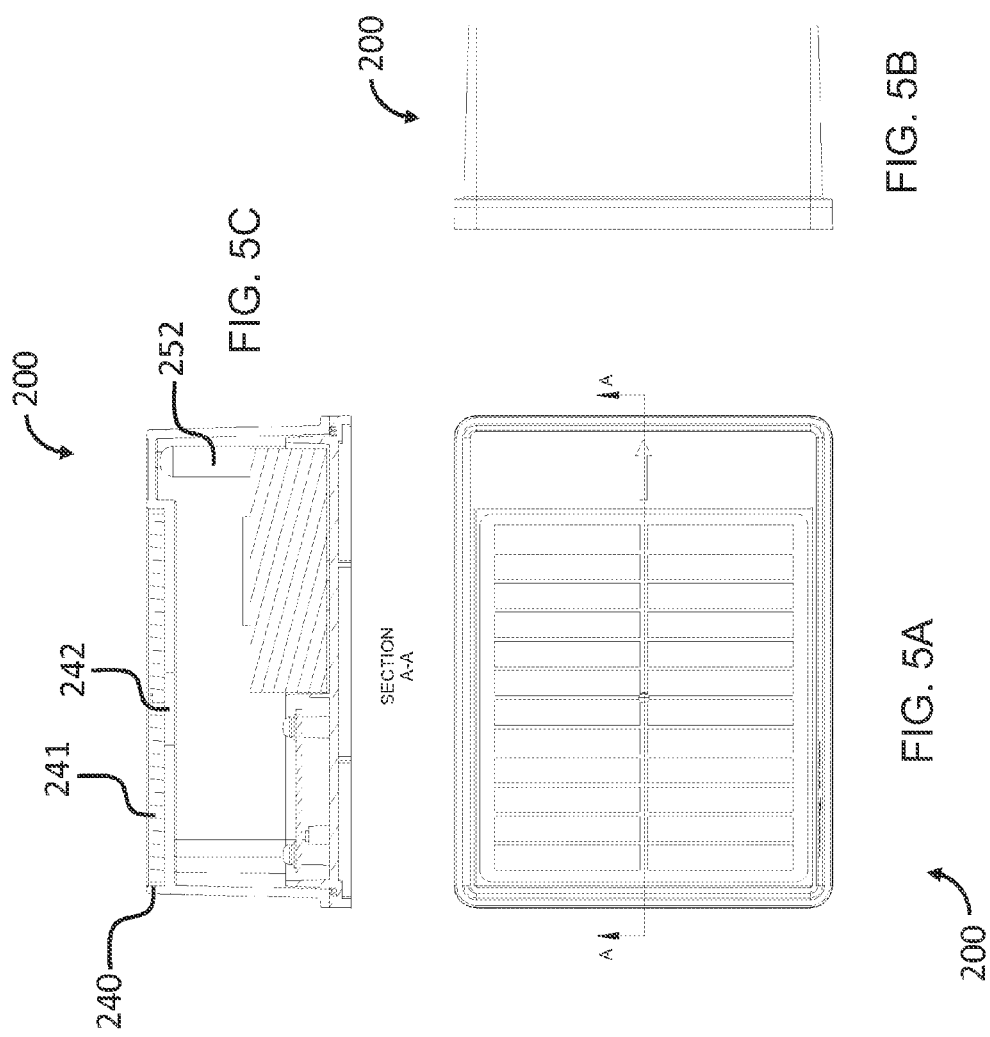

SOLAR BATTERY WIRELESS INCLINOMETER

FIELD OF THE INVENTION

Embodiments of the present invention relate generally to a rod pumping system. For example, embodiments of the present invention relate to an apparatus for measuring an angle of the walking beam of a rod pumping system.

BACKGROUND

Inclinometers are used in rod pumping systems to measure the angle of a walking beam. This measurement is helpful for determining the operating status of a rod pumping system. For example, an inclinometer installed on a beam of a polished rod pumping system may be used to determine the running distance of the polished rod during pumping operation. Based on the polished rod running distance, information on the pump running status can be obtained.

Existing inclinometers are typically powered by an external power supply, which is often an independent power source needing regular replacement and maintenance. U.S. Pat. No. 7,219,723 to Barnes shows an example of an external power supply. Because the power supply is external to the inclinometer, resulting wires are easily damaged due to the environment (e.g., water and heat). Water can also leak into the inclinometer at the places where the external wires are connected to the inclinometer. Furthermore, installation of the inclinometer is difficult due to the separate external power supply and other external components such as antennas. Attaching such an inclinometer to the walking beam can be awkward, but placement should be precise in order to obtain accurate measurements.

SUMMARY

An inclinometer provides inclination data of a walking beam in a rod pumping system, The inclinometer includes a cover including an indented portion external to the inclinometer; a chassis, the cover attached to the chassis, and the cover and the chassis providing an internal area of the inclinometer; one or more magnets attached to a bottom of the chassis and configured to magnetically attach the inclinometer to the walking beam; a power supply within the internal area of the inclinometer and including a power storage and a charger; a solar panel disposed in the indented portion of the cover and electrically connected to the power supply through a hole in the cover; an antenna, wherein the antenna is within the internal area of the inclinometer; beam angle sensor circuitry configured to measure an inclination of the walking beam and transmit corresponding inclination measurement data via the antenna, wherein the power supply is configured to supply power to the beam angle sensor circuitry.

A method of manufacturing an inclinometer that provides inclination data of a walking beam in a rod pumping system includes providing a cover including an indented portion external to the inclinometer; providing a chassis, the cover attached to the chassis, and the cover and the chassis providing an internal area of the inclinometer; providing one or more magnets attached to a bottom of the chassis and configured to magnetically attach the inclinometer to the walking beam; providing a power supply within the internal area of the inclinometer and including a power storage and a charger; providing a solar panel disposed in the indented portion of the cover and electrically connected to the power supply through a hole in the cover; providing an antenna, wherein the antenna is within the internal area of the inclinometer; providing beam angle sensor circuitry configured to measure an inclination of the walking beam and transmit corresponding inclination measurement data via the antenna, wherein the power supply is configured to supply power to the beam angle sensor circuitry.

BRIEF DESCRIPTION OF THE DRAWINGS

The accompanying drawings, which are included to provide a further understanding of embodiments the invention and are incorporated in and constitute a part of this specification, illustrate implementations of the invention and together with the description serve to explain the principles of embodiments of the invention. Throughout the drawings, same or similar reference numbers may be used to indicate same or similar parts. In the drawings:

FIG. 2 illustrates an embodiment of the inclinometer of the present invention mounted on a beam of an example rod pumping system;

FIG. 4A illustrates a perspective view of an inclinometer according to an embodiment of the present invention;

FIG. 4B illustrates a perspective view of an inclinometer according to an embodiment of the present invention;

FIG. 5A illustrates a top view of an inclinometer according to an embodiment of the present invention;

FIG. 5B illustrates a side view of an inclinometer according to an embodiment of the present invention;

FIG. 5C illustrates a cross-section of an inclinometer according to an embodiment of the present invention at A-A of FIG. 5A.

DETAILED DESCRIPTION

Reference will now be made in detail to embodiments of the present invention, examples of which are illustrated in the accompanying drawings. It is to be understood that the figures and descriptions included herein illustrate and describe elements that may be of particular relevance to the present invention, while eliminating, for purposes of clarity, other elements found in typical rod pumping systems or methods.

Figure 1:
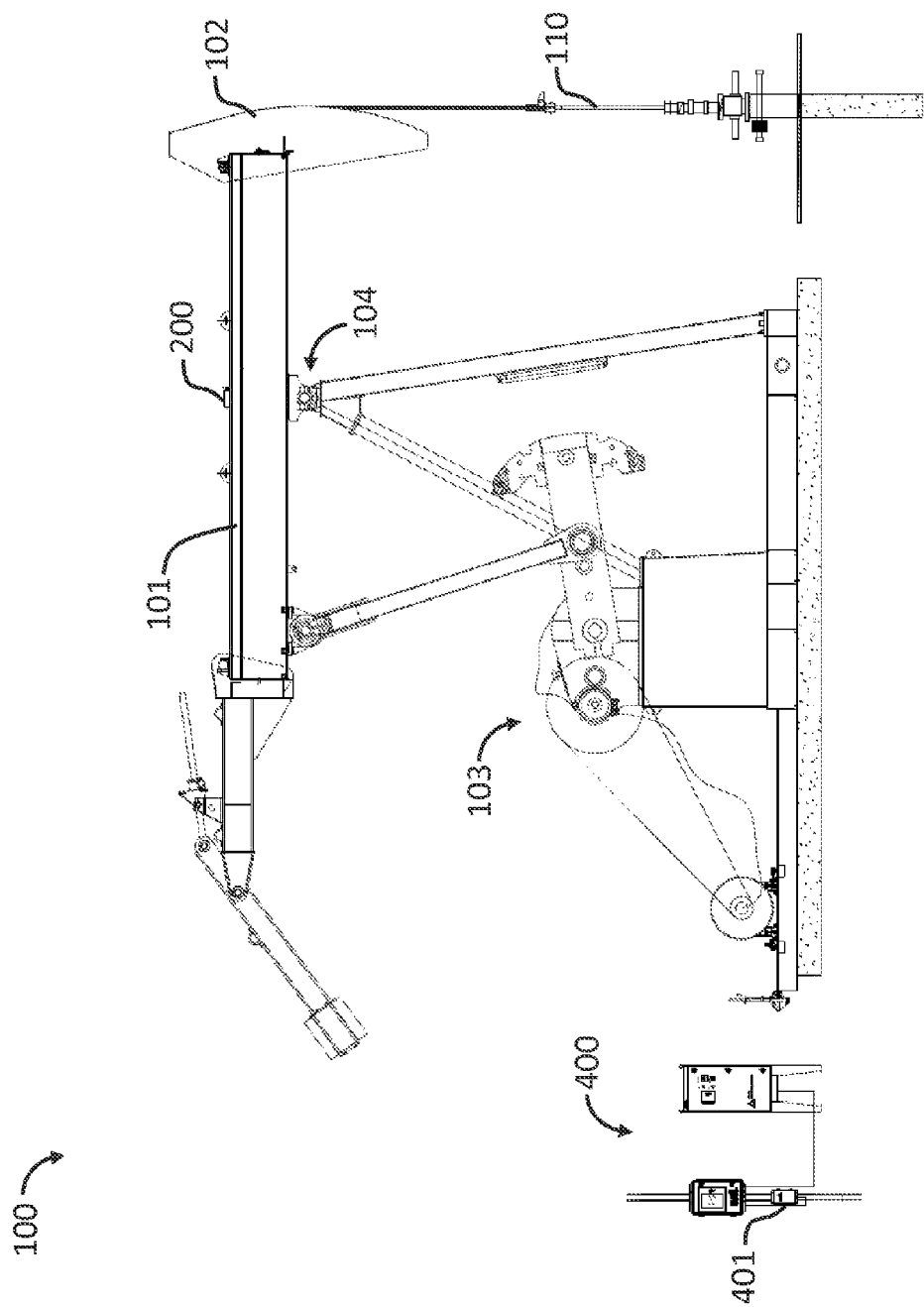
FIG. 1 illustrates an example rod pumping system together with an embodiment of the inclinometer of the present invention.

FIG. 1 illustrates a rod pump system 100 which may be used to pump oil, together with an embodiment of an inclinometer 200 of the present invention. The example rod pumping system 100 includes a walking beam 101, horsehead 102, motor and gear drive 103, and polished rod 110. As the horsehead 102 moves up and down during operation of the rod pumping system 100, so does the polished rod 110.

With reference to FIG. 2, the inclinometer 200 may be installed on the walking beam 101 of the pumping system 100. In an example embodiment, the inclinometer 200 is installed on the walking beam 101 above the pivot point 104; however, embodiments of the invention are not limited thereto.

Figure 3A:
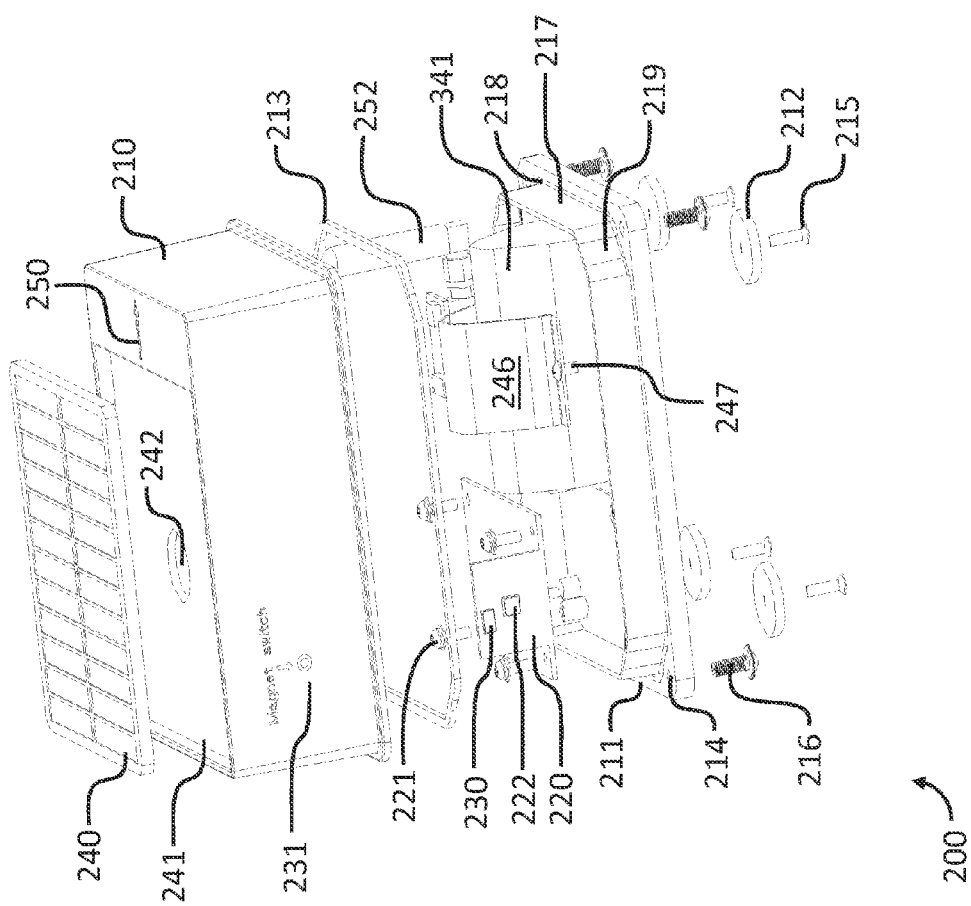
FIG. 3A illustrates an exploded view of an inclinometer according to an embodiment of the present invention.

With reference to FIGS. 3A and 4A, the inclinometer 200 may be installed on the walking beam 101 through use of magnets 212 attached to the inclinometer 200. The magnets 212 may be attached to the inclinometer 200 by, for example, screws 215 secured to a bottom chassis 211 of the inclinometer 200. The magnets 212 may thereby form a part of inclinometer 200 and allow the inclinometer 200 to be magnetically secured to the walking beam 101. This sort of magnetic attachment mechanism provides practical advantages, because the walking beam 101 does not need to be modified (e.g., drilled) in order to install the inclinometer 200. Furthermore, adjustments to the position of the inclinometer 200 can easily be made. While the inclinometer according to embodiments of the present invention is structured to be relatively maintenance free, the inclinometer 200 with these features can also be easily removed for maintenance.

In example embodiments, the magnets 212 are circularly-shaped. As shown in FIG. 4A, each of four magnets 212 may be placed diagonally inward of corresponding screws 216. In 100 some embodiments of the invention, the magnets 212 are structured to receive screws 215, but in other embodiments, the magnets may be secured to the bottom chassis 211 by use of bolts or glue.

Figure 3B:
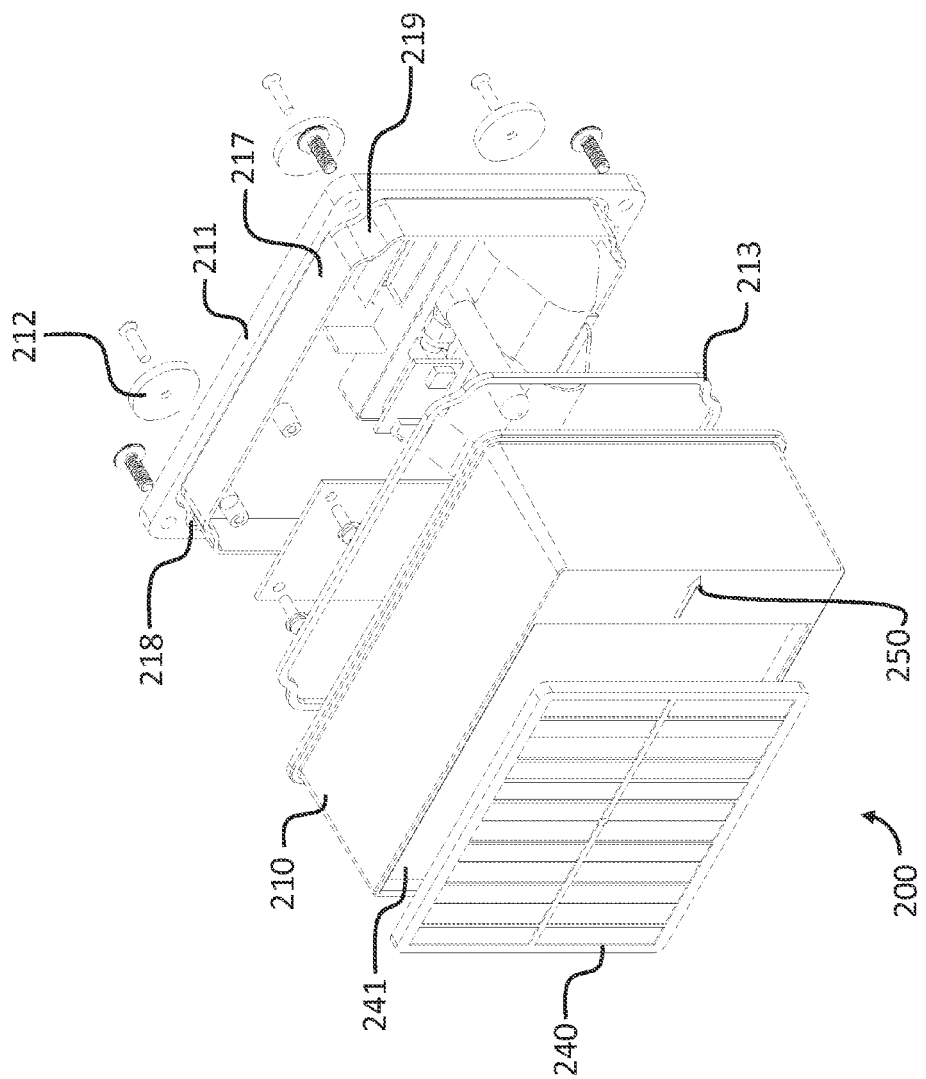
FIG. 3B illustrates another exploded view of an inclinometer according to an embodiment of the present invention.

With reference to FIGS. 3A and 3B, for assisting in installation, an upper cover 210 of the inclinometer 200 may include an arrow 250 that is used to determine the proper orientation of 105 inclinometer 200 at installation. For example, arrow 250 may be placed to point towards the horsehead 102 of the system 100 when the inclinometer 200 is properly installed.

While the embodiments of the invention described above allow the inclinometer 200 to magnetically attach to walking beam 101 and may provide advantages associated therewith, embodiments of the invention are not necessarily limited thereto.

The outer body of the inclinometer 200 may include the upper cover 210 and the bottom chassis 211. In some embodiments of the invention, the cover 210 may be made of plastic; however, other materials may be used. In example embodiments, the cover 210 is made of a material such as plastic so as not to significantly interfere with wireless transmissions. The upper cover 210 may be roughly rectangular in shape and may be secured to the bottom chassis 211 in a groove 218 on the chassis 211 that defines an outline of the bottom edge of cover 210. In some embodiments, a gasket 213 may be provided in the groove and between the chassis 211 and the cover 210 in order to provide additional protection from the outdoor elements. The cover 210 may include holes aligned with holes 214 and configured to receive, for example, screws or bolts 216, so that the chassis 211 may be tightly secured to cover 211 by tightening the screws.

The gasket 213 may be made of rubber or another elastomeric/compressible water-resistant or water-proof material. In some embodiments of the invention, the gasket 213 provides a waterproof seal between the cover 210 and the chassis 211, thereby providing an internal area of the inclinometer 200 that is protected from the outdoor elements.

On top of the cover 210 may be an indented portion 241. This indented portion 241 of the cover 210 may be shaped to correspond to the shape of a solar panel 240 which is placed within the indented portion 241 and secured to the cover 210. The solar panel 240 may be secured through use of glue or another adhesive material. The solar panel 240 may comprise a set of solar photovoltaic modules and may derive current from external light to thereby provide energy to the inclinometer 200. Because the solar panel 240 is formed on top of the inclinometer 200 as part of the inclinometer 200, electric cable(s) connected to an exterior power source are eliminated. Therefore, embodiments of the invention may ease the facilitation of inclinometer maintenance, improve energy efficiency, and avoid the impact that outdoor elements such as heat and water typically have on external cables and other elements.

The power connection between the solar panel 240 and other circuitry of the inclinometer 200 may be made through wire(s) connecting to the solar panel 240 to a charger 310 discussed below. These wires may pass through a through-hole 242 of the cover 210. In some embodiments of the invention, the hole 242 is positioned in the middle of the indented portion 241 of the cover 210 so that any water or other external elements has the furthest distance to travel underneath solar panel 240 before reaching the hole 242, thereby reducing the likelihood that water is able to leak into the interior of the inclinometer 200.

The bottom chassis 211 of the inclinometer 200 may further include a rim 217. The sides of this rim 217 may be flush with the upper cover 210 when the cover 210 is secured to the chassis 211. The rim 217 may thereby provide additional protection from exterior elements such as water, because water would have to first get past the gasket 213 and then rise above the height level of the sides of the rim 217 which is flush with the upper cover 210.

The rim 217 may further include waved portions 219 which are interior of the respective holes 214. In this way, any water that may leak through the holes 214 from underneath the inclinometer is nevertheless blocked by leaking into the interior of the inclinometer by the waved portions 219 of the rim 217.

To turn on or off the inclinometer 200, the upper cover 210 of the inclinometer 200 may include a location 231 corresponding to a magnetic control button 230 mounted on printed circuit board 220. As shown in FIG. 3A, this location 231 may, for example, be labeled on the exterior of the upper cover 210 as a "magnet switch." By placing a permanent magnet at this location, the inclinometer 200 may be powered on. By including this "magnet switch" rather than a traditional button-style switch, there is no possibility for water to enter the interior of the inclinometer 200 through the switch.

The interior of the inclinometer 200 may include the circuitry and power supply of the inclinometer. The power supply may include an electrical power storage 341 secured to chassis 211 via screws or bolts 247 and a bracket 246. In some embodiments of the invention, the power storage 341 and bracket 246 have a smoothly curved triangular shape, and the power storage 341 includes a battery.

Figure 6:
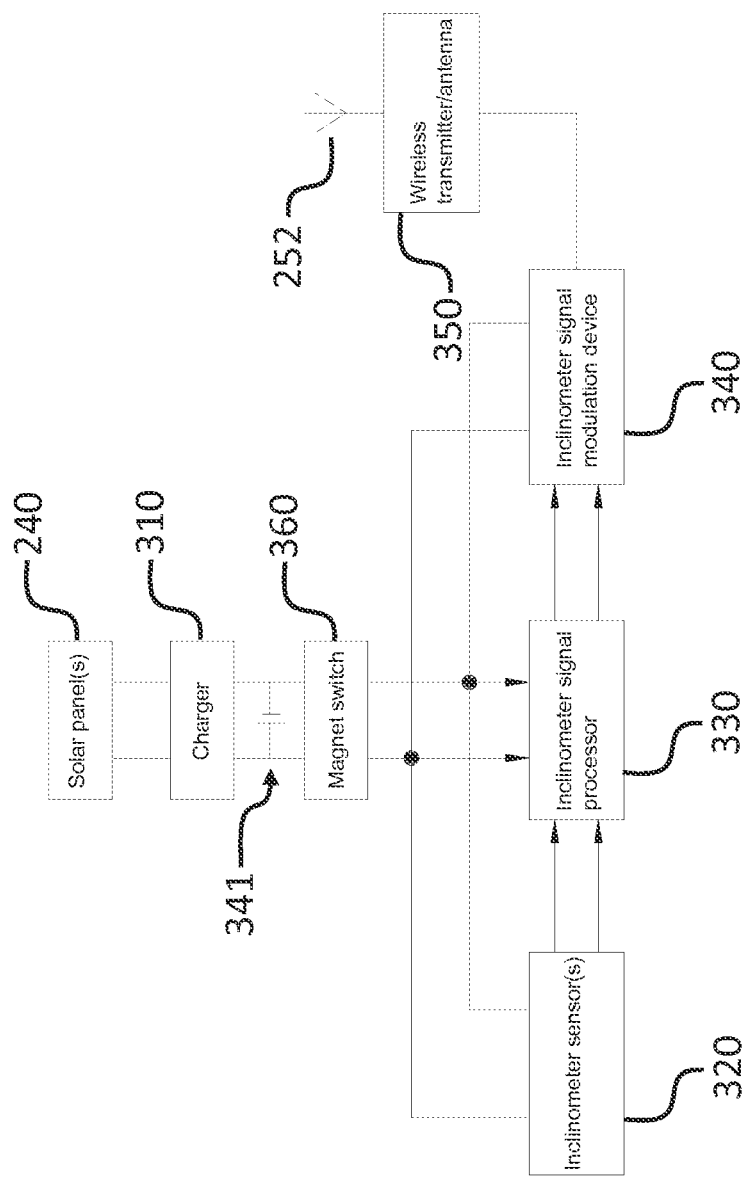
FIG. 6 illustrates a block diagram of circuitry according to an embodiment of the present invention.

FIG. 6 illustrates a schematic circuit configuration of the inclinometer 200 according to some embodiments of the invention. With reference to FIG. 6, as mentioned above, the solar panel 240 may be connected to a charger 310. This connection may be a parallel connection. The charger 310 may in turn be connected to the electrical power storage 341. The charger 310 and power storage 341 (which may be termed a "power supply") may be connected in parallel to inclinometer (beam angle) sensor 320, signal processor 330, and signal modulation device 340, via magnet switch 360. The magnet switch 360 may turn on or off this parallel connection between the power supply and sensor 320, processor 330, and device 340. The sensor 320, signal processor 330, and signal modulation device 340 may be included on printed circuit board 220 (see FIG. 3A). The charger 310 may receive current from the solar panel 240 and charge the power storage 341 with energy based on this current. The solar panel 240, charger 310, and electrical power storage 341 may help to ensure stable or constant current for the inclinometer even during cloudy days, night time, or other low-light situations. In some embodiments of the invention, the power supply may connect to the sensor 320, signal processor 330, and modulation device 240 in parallel.

The inclinometer (beam angle) sensor 320 may be configured to sense and output, as an electrical signal, the angle of the walking beam 101. In an example embodiment, the inclinometer sensor 320 may include accelerometer circuitry such as the Analog Devices™ ADXL203 accelerometer. However, the inclinometer sensor 320 is not limited thereto. The beam angle signal may be output from the sensor 320 to the beam angle signal processor 330, which may calculate the angle of the walking beam 101 based on the signal, and output this processed beam angle signal to the modulation device 340. The modulation device 340 may modulate and/or amplify the signal received from the processor 330 to be suitable for transmitting, and output the modulated and/or amplified signal to wireless transmitter 350. In some embodiments of the invention, the above circuitry may include a non-transitory computer readable storage medium for providing appropriate instructions to the processor(s).

While FIG. 6 shows modulation device 340 separate from the wireless transmitter 350, in some embodiments, the modulation device 340 may be included as part of the wireless transmitter 350. Furthermore, the modulation device 340 and/or the wireless transmitter 350 may or may not include an amplifier.

With reference back to FIGS. 3B and 5C, the wireless transmitter 350 is connected to a wireless antenna 252. The antenna 252 may be internal to the inclinometer 200. In embodiments where the cover 210 is made of plastic, interference with the reception and transmission of wireless signals via the antenna 252 may thereby be low. By placing the antenna 252 inside the inclinometer 200, water leakage possibilities are even further avoided because there is no need for a connection through the upper cover 210 between the internal circuitry and the antenna 252. Furthermore, the antenna 252 of the inclinometer 200 is less likely to be damaged (e.g., broken) in installation and transport.

The indented portion 241 of the upper cover 210 may be absent at a location where the antenna 252 is located internal to the inclinometer 200. As can be seen in FIG. 5C, in this way, an increased height may be provided for the length of antenna 252.

With reference to FIG. 1, in some embodiments of the invention, the wireless transmitter 350 may transmit beam angle data via antenna 252 to, for example, a nearby receiver, station, or other device that can monitor the measured incline of the walking beam 101. For example, the wireless transmitter 350 may transmit modulated inclination data to a wireless inclinometer receiver module 401 connected to a rod pump controller 400 in order that the rod pumping system 100 may be appropriately controlled and monitored.

Any reference in the specification to "one embodiment" or "an embodiment" means that a particular feature, structure or characteristic described in connection with the embodiment is included in at least one embodiment of the invention. The appearances of the phrase "in one embodiment" at various places in the specification do not necessarily all refer to the same embodiment.

Embodiments set forth below correspond to examples of inclinometer implementations of the present invention. However, the various teachings of the present invention can be applied in more than the embodiments set forth below as would be recognized by one skilled in the art.

As will be appreciated by those skilled in the art, changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. An inclinometer to provide inclination data of a walking beam in a rod pumping system, the inclinometer comprising:
    a cover including an indented portion external to the inclinometer;
    a chassis, the cover attached to the chassis, and the cover and the chassis providing an internal area of the inclinometer;
    one or more magnets attached to a bottom of the chassis and configured to magnetically attach the inclinometer to the walking beam;
    a power supply within the internal area of the inclinometer and including a power storage and a charger;
    a solar panel disposed in the indented portion of the cover and electrically connected to the power supply through a hole in the cover;
    an antenna, wherein the antenna is within the internal area of the inclinometer;
    beam angle sensor circuitry configured to measure an inclination of the walking beam and transmit corresponding inclination measurement data via the antenna, wherein the power supply is configured to supply power to the beam angle sensor circuitry; and
    a magnetic switch within the internal area of the inclinometer and disposed at a side of the cover, the magnetic switch configured such that the power supply is connected or disconnected to the beam angle sensor circuitry by placement of a magnet at a location exterior to the inclinometer corresponding to the interior location of the magnetic switch.

2. The inclinometer of claim 1, wherein the hole in the cover is circular and disposed in the center of the indented portion.

3. The inclinometer of claim 1, wherein the chassis includes a rim interior to and flush with the cover.

4. The inclinometer of claim 3, wherein the rim includes four waved portions relative to each of four corners of the chassis, the four waved portions internal to four fastening members securing the chassis to the cover.

5. The inclinometer of claim 1, wherein the cover includes an arrow marking to indicate proper orientation of the inclinometer on the walking beam.

6. The inclinometer of claim 1, wherein the chassis includes a groove corresponding to an outline of a bottom edge of the cover, the bottom edge of the cover disposed in the groove with a gasket disposed therebetween.

7. A method of manufacturing an inclinometer to provide inclination data of a walking beam in a rod pumping system, the method comprising:
    providing a cover including an indented portion external to the inclinometer;
    providing a chassis, the cover attached to the chassis, and the cover and the chassis providing an internal area of the inclinometer;

providing one or more magnets attached to a bottom of the chassis and configured to magnetically attach the inclinometer to the walking beam;

providing a power supply within the internal area of the inclinometer and including a power storage and a charger;

providing a solar panel disposed in the indented portion of the cover and electrically connected to the power supply through a hole in the cover;

providing an antenna, wherein the antenna is within the internal area of the inclinometer;

providing beam angle sensor circuitry configured to measure an inclination of the walking beam and transmit corresponding inclination measurement data via the antenna, wherein the power supply is configured to supply power to the beam angle sensor circuitry; and providing a magnetic switch within the internal area of the inclinometer and disposed at a side of the cover, the magnetic switch configured such that the power supply is connected or disconnected to the beam angle sensor circuitry by placement of a magnet at a location exterior to the inclinometer corresponding to the interior location of the magnetic switch.

* * * * *